Sept. 19, 1944. E. W. JOHNSON 2,358,714
SHOCK ABSORBER
Filed Sept. 18, 1942 2 Sheets-Sheet 1

Inventor
Ernest Wm Johnson
By Watson, Cole, Grindle & Watson,
Attorneys

Sept. 19, 1944.  E. W. JOHNSON  2,358,714
SHOCK ABSORBER
Filed Sept. 18, 1942   2 Sheets-Sheet 2

Inventor
Ernest Wm Johnson
By
Watson Cole
Grindle & Watson
Attorneys

Patented Sept. 19, 1944

2,358,714

UNITED STATES PATENT OFFICE 2,358,714

SHOCK ABSORBER

Ernest William Johnson, Birmingham, England, assignor of one-half to Vandervell Products Limited, London, England, a British company Application September 18, 1942, Serial No. 458,878
In Great Britain October 8, 1941

5 Claims. (Cl. 188—88)

This invention is for improvements in or relating to shock absorbers and has for one of its objects to enable the character or shock-absorbing value of the shock absorber to be changed according to circumstances.

The invention is concerned with shock absorbers of the type in which a restricted passage for the flow of the damping fluid is provided between the opposed surfaces of a perforation in a piston and a metering rod which reaches into said perforation in such manner that the piston reciprocates along the metering rod inside the shock absorber casing, and in which the metering rod has through its interior a by-pass for the said restricted passage. A shock absorber of this type is described in United States Patent No. 2,331,782. In this specification certain constructions are described in which a metering pin reaches into the interior of the metering rod to control the passage of damping fluid through the by-pass. The shock absorber according to the present invention also embodies a metering pin of this general nature but according to the characteristic feature of the present invention the metering pin is a stationary fitting detachably mounted inside the shock absorber casing. Thus, when it is desired to change the character or shock-absorbing value of the shock absorber the stationary metering pin may be removed and another substituted according to requirements. Any fine adjustments required in the shock-absorbing value of the shock absorber may thus be simply effected by changing the metering pin.

Conveniently, the metering pin is formed with two portions of different diameters along its length, the larger of which portions is a close fit in the housing for the pin, and the smaller of which portions is smaller than the by-pass passage through the metering rod and reaches into said by-pass passage to a position to control the mouth of a conduit in the metering rod which extends from the by-pass passage to the exterior of the rod. The said larger portion of the metering pin may be directly housed in the bore of the metering rod and the pin be detachable by sliding endwise when the end of the metering rod is exposed.

For a more complete understanding of these and other features of the invention there will now be described, by way of example only and with reference to the accompanying drawings, certain alternative constructions of shock absorber according to the invention. It is to be understood, however, that the invention is not restricted to the precise constructional details set forth.

In these drawings.

Like reference numerals indicate like parts throughout the drawing.

Figure 1:
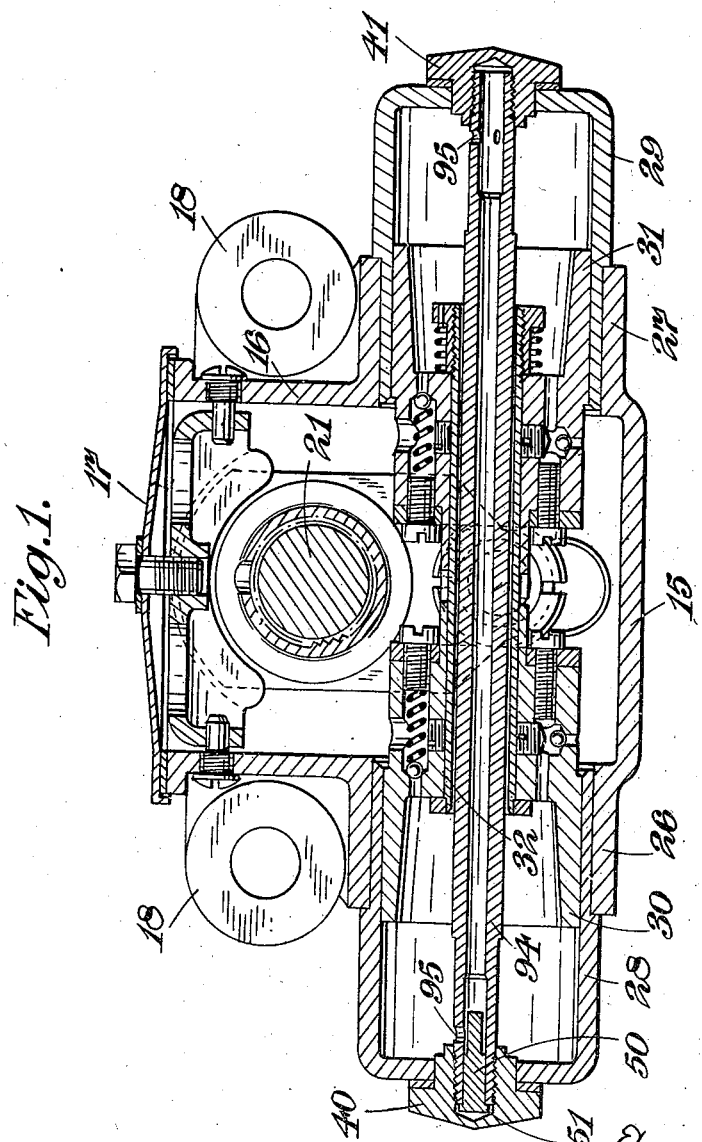
Figure 1 is a sectional elevation corresponding in most respects to Figure 1 of the drawings of the specification Serial No. 434,154.

Referring firstly to Figure 1, it is not necessary to describe herein the whole of the details shown in this figure because, as already indicated, many of them are already described in Patent No. 2,331,782. The main features of the construction shown in Figure 1 are as follows:

The shock absorber comprises a casing 15 with an upstanding centre barrel 16 having a cover plate 17. At the sides, there are lugs 18 whereby the casing is mounted in place, and the barrel 16 provides bearings for a rock shaft 21 which is connected to one of the parts to be controlled by the shock absorber. The casing 15 has bosses 26 and 27 which receive the fluid container cylinders 28 and 29 in which are pistons 30 and 31 which are received on a sleeve 32 and a seal is made between each piston and the appropriate end of the sleeve. The outer ends of the cylinders 28 and 29 have end caps 40 and 41 into both of which a metering rod 94 is screwed. The metering rod 94 reaches right through the interior of the sleeve 32 and the restricted passage through which the damping fluid passes between the cylinders 28 and 29 lies between the opposed surfaces of the sleeve 32 and the metering rod 94. In use, fluid will be forced from the cylinder 28 to the cylinder 29, and vice versa along the said restricted passage as the rock shaft 21 oscillates. The metering rod 94 is hollow and near each end has lateral conduits 95 establishing communication between its interior and exterior. Thus the bore of the rod 94 provides a by-pass with respect to the restricted passage which lies between the exterior of the rod 94 and the interior of the sleeve 32.

The present invention is concerned with metering the fluid traversing the by-pass and for this purpose there is shown at the left-hand side of Figure 1 a stationary metering pin 50 which, towards its outer end, is a close or push fit in the bore of the rod 94. Towards its inner end it is reduced in diameter and lies opposite to the mouth of the conduit 95. Thus the damping fluid has to pass around the reduced portion of the pin 50 in order to reach the conduit 95, and by choosing a suitable diameter for this reduced portion of the metering pin, any desired metering action as applied to the damping fluid travelling along the by-pass can be obtained. This metering action will apply not only to damping fluid passing out of the by-pass passage but also to damping fluid passing into the by-pass passage.

By removing the cap 40, the end of the metering rod 94 is exposed and the pin 50 can then be removed by sliding endwise if it is desired to replace it by another pin in order to vary the metering effect. It will be appreciated that the cap 40 is arranged to prevent undesired endwise movement of the pin 50 in the outward direction. To prevent undesired movement in the inward direction, the pin 50 is formed with a head 51 to seat against the end of the metering rod 94. Thus it will be seen that the pin 50 is maintained stationary when the parts have been assembled.

Figure 2:
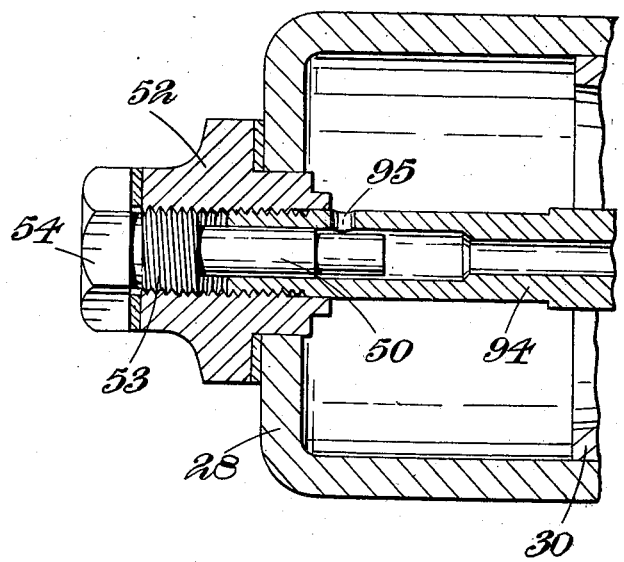
Figure 2 is a detail sectional view of a modified construction on a scale larger than that of Figure 1.

In the construction shown in Figure 2, the metering rod 94 is secured in place in the shock absorber casing by a detachable cap 52 with a through screw threaded bore into the inner end of which the metering rod is screwed. The metering pin 50 is formed with a screw-threaded head 53 which is screwed into the outer end of the bore in the cap 52 so as to bring its reduced inner end opposite to the conduit 95. The head of the pin 50 terminates in a nut 54 which seats against the outer face of the cap 52, with an interposed washer, when the parts are assembled. Thus the metering pin 50 is held stationary in its proper operative position but it can readily be removed for exchange purposes without detaching the cap 52.

Figure 3:
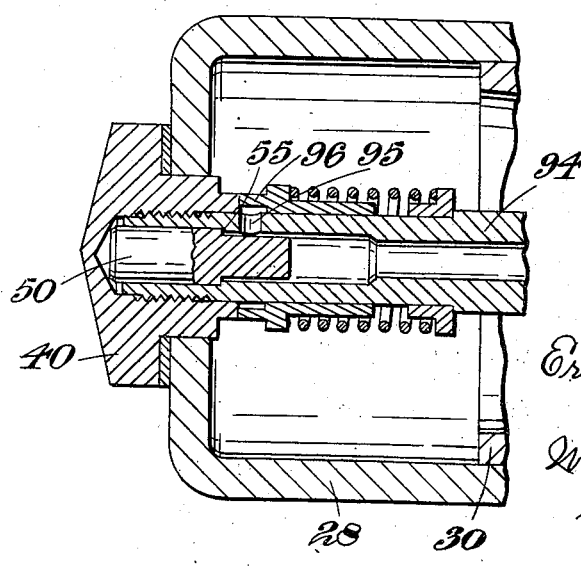
Figure 3 is a view similar to Figure 2 of another modified construction.

The construction shown in Figure 3 is similar to that shown in Figure 2, except that an abutment or shoulder 55 is formed in the interior of the metering rod 94 in order to prevent undesired inward movement of the metering pin 50. Undesired outward movement is prevented by the cap 40. In this construction the conduit 95 in addition to being metered by the pin 50, is also controlled by a sleeve valve 96, the operation of which is described in the aforesaid specification Serial No. 434,154.

In all of the constructions according to the present invention, the metering pin 50 is stationary. That is to say, it does not move in operation after it has once been placed in position.

It is to be understood that the invention is not restricted to the precise constructional details set forth.

I claim:

1. In a shock absorber in which fluid friction is employed for damping, the combination of a casing embodying two fluid containers, a piston reciprocable in one of said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a stationary metering pin which reaches into the interior of the metering rod to control the passage of damping fluid through the by-pass, and means for detachably mounting said stationary metering pin inside the shock absorber casing and for precluding endwise movement of the metering pin after the parts have been assembled.

2. In a shock absorber in which fluid friction is employed for damping, the combination of a casing embodying two fluid containers, a piston reciprocable in one of said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod near one end and with a housing at said end for a metering pin, a stationary metering pin to control the passage of damping fluid through the by-pass, which pin is formed with two portions of different diameters along its length, the larger of which is a close fit in said housing and the smaller of which is smaller than the by-pass passage through the metering rod and reaches into said by-pass passage to a position to control the mouth of the said lateral conduit, and means for detachably securing the metering pin in said housing and maintaining it against endwise movement after the parts have been assembled.

3. In a shock absorber in which fluid friction is employed for damping, the combination of a casing embodying two fluid containers, a piston reciprocable in one of said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod near one end, a stationary metering pin to control the passage of damping fluid through the by-pass, which pin is formed with two portions of different diameters along its length, the larger of which is a close fit in the bore of the metering rod and the smaller of which is smaller than the by-pass passage through the metering rod, and means for detachably securing the metering pin in the end of the metering rod in such manner that its smaller portion reaches into the by-pass passage to a position to control the mouth of the said lateral conduit, and that the pin is detachable by sliding endwise when the end of the metering rod is exposed but that all endwise movement is prevented when the parts are assembled.

4. In a shock absorber in which fluid friction is employed for damping, the combination of a casing embodying two fluid containers, a piston reciprocable in one of said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a stationary metering pin which reaches into the interior of the metering rod to control the passage of damping fluid through the by-pass, and a detachable end cap with a through screwthreaded bore into the inner end of which is screwed an end of the metering rod in such manner that the end cap seats against the shock absorber casing to secure the metering rod in position and into the outer end of which bore the head of the metering pin is screwed in such manner that the body of the metering pin reaches into the bore of the metering rod to a position to control the mouth of the said lateral conduit.

5. In a shock absorber in which fluid friction is employed for damping, the combination of a casing embodying two fluid containers, a piston reciprocable in one of said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a stationary metering pin which reaches into the interior of the metering rod to control the passage of damping fluid through the by-pass, and a detachable end cap with a through screwthreaded bore into the inner end of which is screwed an end of the metering rod in such manner that the end cap seats against the shock absorber casing to secure the metering rod in position and into the outer end of which bore the head of the metering pin is screwed in such manner that the body of the metering pin reaches into the bore of the metering rod to a position to control the mouth of the said lateral conduit and the outer end of which head on the metering pin affords a shoulder which seats against the outer face of the said cap when the parts are assembled.

ERNEST WILLIAM JOHNSON.